(12) United States Patent
Bare

(10) Patent No.: US 10,509,843 B2
(45) Date of Patent: Dec. 17, 2019

(54) SYSTEMS AND METHODS FOR MANAGING TABS IN WEB APPLICATIONS

(71) Applicant: salesforce.com, inc., San Francisco, CA (US)

(72) Inventor: Abhijit Bare, Dublin, CA (US)

(73) Assignee: salesforce.com, inc., San Francisco, CA (US)

(*) Notice: Subject to any disclaimer, the term of this patent is extended or adjusted under 35 U.S.C. 154(b) by 140 days.

(21) Appl. No.: 15/337,766

(22) Filed: Oct. 28, 2016

(65) Prior Publication Data

US 2018/0121559 A1    May 3, 2018

(51) Int. Cl.
| | | |
|---|---|---|
| *G06F 3/0483* | (2013.01) | |
| *G06F 16/957* | (2019.01) | |
| *G06F 16/25* | (2019.01) | |
| *G06F 16/958* | (2019.01) | |
| *G06F 16/955* | (2019.01) | |

(52) U.S. Cl.
CPC ........ *G06F 16/9577* (2019.01); *G06F 3/0483* (2013.01); *G06F 16/252* (2019.01); *G06F 16/958* (2019.01); *G06F 16/9566* (2019.01)

(58) Field of Classification Search
CPC .................................................. G06F 3/0483
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |

(Continued)

*Primary Examiner* — Keith D Bloomquist
(74) *Attorney, Agent, or Firm* — Lorenz & Kopf, LLP

(57) ABSTRACT

A computer implemented method includes receiving, at the browser application, a first request for web resources based on user selection of a first hyperlink outside of the web application; determining if the first hyperlink is associated with a record accessible by the web application from the database system; determining, when the first hyperlink is associated with the record for the web application, if a web application interface for the web application is active in at least one navigation tab of the browser application; and presenting, when the first hyperlink is associated with the record for the web application and the web application interface for the web application is active in the at least one navigation tab, the record within a console tab of the web application interface in the at least one navigation tab.

20 Claims, 7 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0225232 A1* | 9/2011 | Casalaina ............ G06F 3/0483 709/203 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0173720 A1* | 7/2013 | Vasudev ................ H04L 51/18 709/206 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

US 10,509,843 B2

SYSTEMS AND METHODS FOR MANAGING TABS IN WEB APPLICATIONS

TECHNICAL FIELD

Embodiments of the subject matter described herein generally relate to providing web resources, and particularly relate to systems and methods for managing navigation tabs in web applications.

BACKGROUND

Modern software development is evolving away from the client-server model toward network-based processing and database systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware. A customer relationship management (CRM) system is one example of an application that is suitable for deployment as a cloud-based service.

One type of network-based processing and database system may include a web or console application that provides a user interface to a community of users to interact with stored data, data collections, or customized sub-applications. These systems may be accessible via web browser applications on user devices. Generally, providers and administrators are continuously attempting to increase the user participation and utility of these systems.

Accordingly, it is desirable to provide improved systems and methods for accessing web applications of networked-based database systems. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Broadly, exemplary embodiments discussed herein provide systems and methods for improved presentation of web resources on a browser application of a user device. In particular, embodiments provide the ability to more efficiently manage navigation and console tabs when accessing a web application of a database system by opening new records within the appropriate navigation tab as a console tab, regardless of the source of the associated hyperlink.

Figure 1:
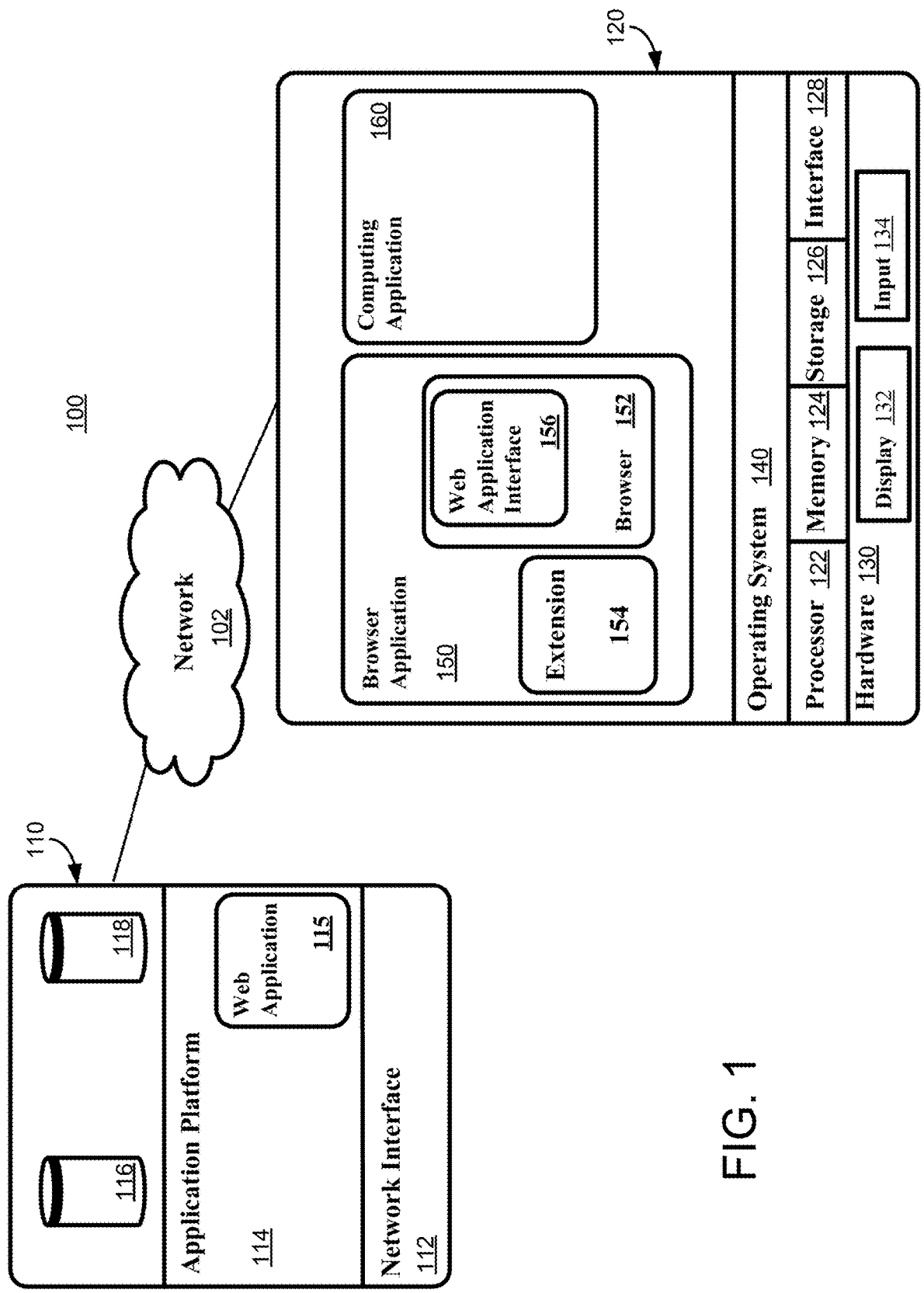
FIG. 1 is a schematic block diagram of an environment for the presentation of web resources to a user in accordance with an exemplary embodiment.

FIG. 1 is a block diagram of an example embodiment of a system or environment 100 for providing web resources. In one embodiment, the environment 100 may include one or more database systems (or services) 110 storing web resources accessible by one or more user devices (or systems) 120 via a network 102. Although only one of each is shown, any number of user devices 120 accessing any number of database systems 110 is contemplated. Although not depicted in FIG. 1, the database system 110 may be deployed in the context of a multi-tenant application system, such as the system described below with reference to FIG. 7.

One arrangement for elements of database system 110 is shown in FIG. 1, including a network interface 112, application platform 114, user data storage 116 for user data, and system data storage 118 for system data. Such user and/or system data may include program code for implementing various functions of the system 110 and executing system processes and user-specific processes, such as running applications as part of an application hosting service. The database system 110 may be considered a relational database in which a management system or equivalent may execute storage and retrieval of information against stored database objects. In one embodiment, the database system 110 may be considered an on-demand database service and/or a network-based processing and database system.

As introduced above, in one embodiment, the application platform 114 may be a framework that allows the applications of database system 110 to create, manage, and execute of one or more applications developed by the provider of the database system 110, users accessing the database system 110, or third party application developers accessing the database system 110. One such example application, as depicted in FIG. 1, is a web application 115 that is generated and/or stored by the application platform 114. In this context, a "web application" is a cloud-based database application that enables a user to access records, customized sub-applications, and other processing resources stored in user data storage 116 and/or system data storage 118 via the user device 120, as described below.

According to one embodiment, the database system 110 is configured to provide webpages, forms, applications, data and media content via the web application 115 to user devices 120 as tenants or clients of database system 110. As such, database system 110 may provide security mechanisms to keep the data of each user (or group of users) separate unless the data is shared. Moreover, the users may differ in their respective capacities, and the capacity of a particular user device 120 may be determined by permission levels for the current user. For example, the user may be an employee with capacities associated with the employee duties or an administrator with additional capacities with regard to accessing and modifying application and database information.

The network interface 112 includes hardware and software suitable for communicating over network 102. Generally, network 102 is any network or combination of networks of devices that communicate with one another. For example, network 102 can be any one or any combination of a LAN (local area network), WAN (wide area network), telephone network, an intranet, an extranet, a virtual private network (VPN), wireless network, point-to-point network, star network, token ring network, hub network, or other appropriate configuration. One typical example is a TCP/IP (Transfer Control Protocol and Internet Protocol) network (e.g., the Internet, referring to a specific global internetwork of networks), which is used in many of the examples discussed herein. However, it should be understood that the networks used in some embodiments are not so limited.

In one embodiment, database system 110 implements a web-based customer relationship management (CRM) system such as a service cloud console. For example, in one embodiment, database system 110 includes application servers configured to implement and execute CRM software applications (e.g., as web application 115) as well as provide related data, code, forms, webpages and other information to and from user devices 120 and to store to, and retrieve from, a database related data, objects, and webpage content as web resources. As described below, the database system 110 may operate the web application 115 via a web application interface in a browser application on the user device 120. In certain embodiments, database system 110 implements applications other than, or in addition to, a CRM application.

In various embodiments, the user device 120 may include a computing device, such as, for example, a shared terminal, a desktop computer, a laptop, a netbook, a tablet, a smartphone, or the like. As shown, the user device 120 may include a processor 122 configured to execute one or more machine executable instructions or pieces of software, firmware, or a combination thereof. The user device 120 may include, in some embodiments, memory 124 configured to store one or more pieces of data, either temporarily, permanently, semi-permanently, or a combination thereof. Further, the memory 124 may include volatile memory, non-volatile memory, or a combination thereof. In various embodiments, the user device 120 may include a storage medium 126 configured to store data in a semi-permanent or substantially permanent form. In various embodiments, the storage medium 126 may be integrated into memory 124.

In various embodiments, the user device 120 may include one or more network interfaces 128 configured to communicate via the network 102, described above. The network interface 128 may communicate in accordance with various types of protocols, such as Wi-Fi protocols, cellular protocols, and wired protocols. As described below, the network interface 128 particularly enables the user device 120 to exchange information with the database system 110.

The user device 120 may further include one or more hardware components 130 for operation, including, as examples, at least one display element or device 132 for presenting web resources and other information to the user and at least one input device 134 that enables the user to interact with the environment 100. The display device 132 and input device 134 particularly enable the display and interface with the web application 115 on a browser application 150, described below.

The user device 120 may further include an operating system (OS) 140 configured to provide one or more services to one or more applications and manage or act as an intermediary between the applications and the various components of the user device 120. Generally, the user device 120 may include any number computing applications, although for the purposes of this discussion, the user device 120 may be considered to include one or more browser applications 150 and one or more computing applications 160.

The browser application 150 and computing application 160 are shown as being hosted locally on the user device 120 in FIG. 1, but it is to be understood that certain functions or aspects of the applications 150, 160 may be hosted on an external server, such as, for example, database system 110, or another server that is accessible from the user device 120 via the network 102.

Generally, the "browser application" collectively refers to one or more applications or elements used to access web resources. The discussion below refers to the web resources as webpages, although the embodiments discussed below are applicable to any type of web resource, including collections of webpages, scripts, images, videos, or other pieces of content. In this context, a "webpage" includes a file, document, or record presented to the user, and a "website" may include a collection or grouping of related webpages. In some instances, one or more websites may be considered to be a domain, which refers to a common source or collection of related websites, webpages, and other web resources. Typically, each web resource is identified by a Uniform Resource Locator (URL) used by the database system 110 to locate the associated web resource. Such URLs may be embodied as hyperlinks.

In one embodiment, the browser application 150 includes a web browser 152 generally configured for retrieving, presenting and interaction with web resources on the database system 110, as well as other sources of web content. Any type of browser 152 may be used, including but not limited to INTERNET EXPLORER™, published by Microsoft Corporation, CHROME™, published by Google Inc., and SAFARI™, published by Apple Inc.

As noted above, the web resources may be identified by a hyperlink. As such, upon selection of a hyperlink by the user, the operating system 140 utilizes the browser 152 to access the web resources on the database system 110 via network 102. In one embodiment, the operating system 140 may allow the browser 152 access to various system resources (e.g., access to the memory 124, storage medium 126, display element 132, input device 134, etc.) to perform various application functions (e.g., contact a website, take a picture, read/write a file, etc.).

In a simple example, upon receipt of a URL representing desired web resources, the browser 152 may generate and communicate a Hyper Text Transfer Protocol (HTTP) request to database system 110, which may respond with one or more Hyper Text Markup Language (HTML) files with the requested web resources. The browser 152 may render a webpage and/or other type of web resource based on the HTML files from database system 110 for presentation to the user. The present disclosure contemplates any suitable format of web resources. As examples and without limitation, webpages may render from HTML files, Extensible Hyper Text Markup Language (XHTML) files, Cascading Style Sheets (CSS), Adobe Flash files, or Extensible Markup Language (XML) files, according to particular needs, and the browser 152 may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. As such, in a basic example, such presentation may include rendering or formatting the data structure (e.g., text elements, form elements, etc.) and displaying the formatted data structure on the user device 120 via the browser 152.

In the depicted embodiment, the browser application 150 may include one or more browser extensions (or extension applications) 154 configured to interact with the browser 152. In this context, an "extension" may include one or more web program files packaged or grouped together as a definable whole, and configured to add functionality to the browser 152. As described below, in one embodiment, the extension 154 may add functionality by altering the way the browser 152 manages tabs when rendering web resources. Such extensions are typically downloaded and installed to function with the browser 152 from a web store associated with the browser 152 (e.g., Google Chrome web store). Typically, the browser extension 154 is specific to a particular type of browser 152, such that the user device 120 may include multiple instances of browser types and associated extensions.

In various embodiments, the browser 152 may be used to access the database system 110 via the web application 115. In particular, the web application 115 may cooperate with the user device 120 to present a web application interface 156 to the user. The web application interface 156 represents a user interface presented in the browser 152 that enables user access to the web application 115, for example, to access the database records and other web resources stored in the database system 110. The term "record" generally refers to a data entity having fields with values and stored in database system 110. As used herein, the term "database record" may be used interchangeably with "record" and may also refer to data retrieved from one or more than one database. An example of a record is an instance of a data object created by one of the users of the database service, for example, in the form of a CRM record about a particular (actual or potential) business relationship or project. The record may have a data structure defined by the database service (a standard object) or defined by a user (custom object). For example, a record may be for a business partner or potential business partner (e.g., a client, vendor, distributor, etc.) of the user, and can include information describing an entire company, subsidiaries, or contacts at the company. In one implementation of a multi-tenant database system, each record for the tenants has a unique identifier stored in a common table. A record may data fields that are defined by the structure of the object (e.g., fields of certain data types and purposes). A record can also have custom fields defined by a user. A field can be another record or include links thereto, thereby providing a parent-child relationship between the records. In addition to records, other types of web application resources or console resources may include user profiles, chatter, information, or data feeds, record lists, custom objects, and/or custom applications.

In practice, the records (or database records) may be presented with other web resources by the web application interface 156 on the browser 152 in the form of webpages or websites, referred to as "record pages," that present details regarding the record and enable the performance of various tasks associated with the record. In effect, the web interface application 156 may be a platform interface common to colleagues, team members, employees, and the like to access the shared web application 115 on individual user devices 120. In some embodiments, the web application and associated interface may be considered a console application and console application interface. Additional details about the browser application 150 will be provided below with reference to FIG. 2.

Generally, the computing application 160 is considered to include one or more applications typical to computing devices, such as e-mail applications, calendars, contact managers, messaging applications, word processing applications, and the like. In addition to the primary functions of respective applications, the computing application 160 may also function to present a hyperlink to initiate access to web resources via the browser application 150. As such, upon user selection of a hyperlink in the computing application 160, the operating system 140 commands the browser application 150 to request and present the associated web resources.

Figure 2:
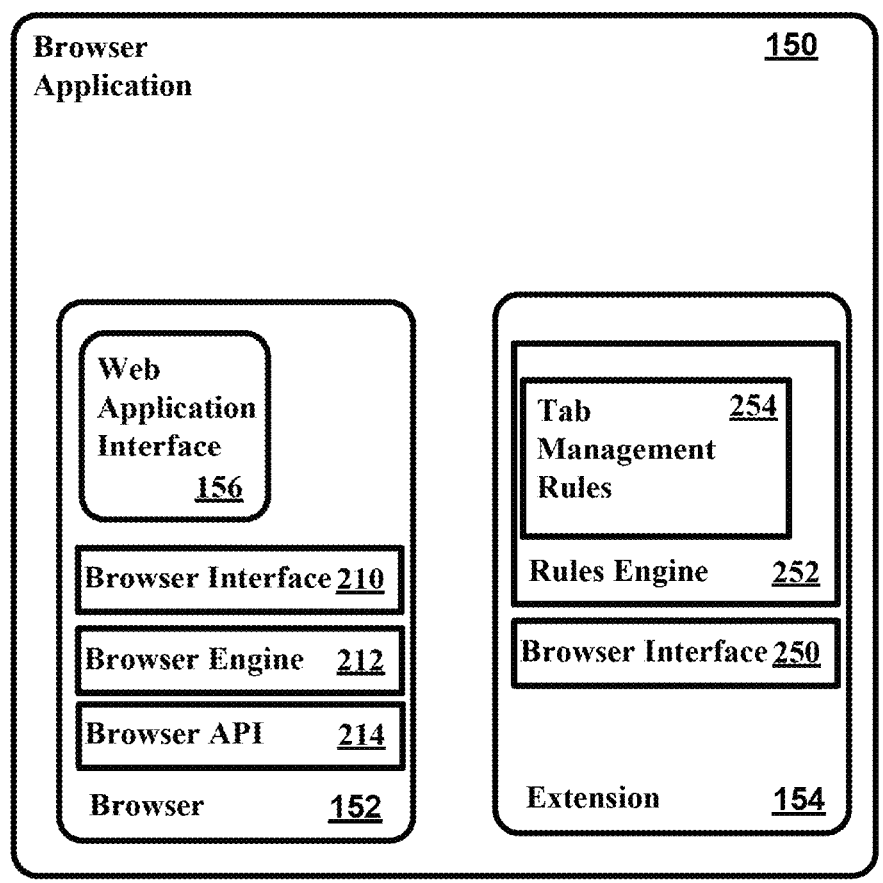
FIG. 2 is a schematic block diagram of a browser application in a user device of the environment of FIG. 1 in accordance with an exemplary embodiment.

FIG. 2 is a functional, more detailed block diagram of the browser application 150 in accordance with an exemplary embodiment. Generally and as introduced above, the browser 152 and the browser extension 154 of the browser application 150 enable the user device 120 to communicate over the network 102 with the web application 115 of the database system 110 to implement the web application interface 156. Although not shown, the browser 152 and/or browser extension 154 may also have access to local storage or data store to enable proper functioning of the browser application 150.

As show, the browser 152 may be considered to include a browser interface 210, a browser engine 212, and an API 214. The browser interface 210 generally enables the user to request, view, and interact with the web resources, including web resources from the database system 110. Graphical examples of the browser interface 210 are provided below. Generally, the browser engine 212 functions to send requests to the database system 110 based on instructions received with the browser interface 210, receive and interpret the reply from the database system 110, and as appropriate, present the web resources to the user on the browser interface 210. As noted above, the reply from the web application 115 of the database system 110 may be a mark-up language document with information and instructions that specify the format and content of the web resources displayed to the user. As such, the browser engine 212 may interpret and exchange suitable forms of information and instruction with the database system 110 for the appropriate functionality of the web resources. The API 214 is configured to enable the browser extension 144 to interact with the browser 152.

The browser 152 presents websites and other web resources to the user in a number of contexts. Typically, the browser 152 is configured to open and present multiple webpages to a user at a time. In particular, the browser engine 212 may open and associate each webpage with a navigation tab such that each webpage is active and may be viewed by selecting the associated navigation (or browser) tab. As such, each navigation tab may be associated with a particular "instance" of a webpage. In the discussion below, the term "navigation tab" refers both to the graphical element (e.g., the tab itself) and the webpages or resources associated with that navigation tab.

As introduced above, the browser engine 212 is also configured to implement the web application interface 156 on the browser interface 210 that enables user access to records and other resources on the database system 110. As described in greater detail below with examples, the web application interface 156 may be rendered with multiple internal tabs, referred to as "console tabs," in which instances of various types of web resources may be presented, including records, record lists, custom applications, and the like. In one particular embodiment, each console tab may be associated with a record and render details about the record in the form of record pages. As a result, the web application interface 156 may present multiple record pages to the user for immediate viewing upon selection of the appropriate console tab. In effect, the console tabs enable navigation between multiple records within a single instance or navigation tab of the web application interface 156 presented on the browser 152. In some embodiments, the database system 110 may have multiple servers accessible via different instances open in different navigation tabs in the browser 152, each of which may have multiple console tabs of associated records.

In the discussion below, an active webpage is a webpage that is presently open within the browser 152 and viewable upon selection of a navigation tab. A web application interface 154 is active when presently open within the browser 152 and viewable upon selection of a navigation tab.

At times, the webpages may contain hyperlinks to additional webpages or web resources. Upon selection of a hyperlink in a webpage, the browser engine 212 typically redirects the current tab of the browser 152 to the new webpage associated with the hyperlink, or in some instances, the browser engine 212 may initiate the opening of a new navigation tab to display the webpage.

The browser 152 may also receive hyperlinks from other sources, such as from computing application 160, outside of the browser application 150. Examples include a hyperlink in an email message or in a word processing document. In most instances, upon receipt of a request to open a hyperlink from another application 160, the browser 152 will open the associated webpage in a new navigation tab. However, as described in greater detail below, the browser extension 154 functions to alter this navigation structure such that web resources may be opened within active navigation tabs, regardless of the source of the hyperlink.

The functional elements of the browser extension 154 will be introduced prior to a more detailed discussion. Generally, the browser extension 154 may be considered to include a browser interface 250 and a rules engine 252. The browser interface 250 functions to manage communication with the browser 152. In one embodiment, a function of the browser extension 154 is to monitor the URLs or other data associated with hyperlinks selected by the user. The rules engine 252 includes one or more logic elements that form tab management rules 254 to improve the management and presentation of web resources in the browser 152. In particular, the rules engine 252 receives the requests and determines if the request triggers one of the rules within the tab management rules 254, and if so, the result. As described below, the rules engine 252 may generate one or more results: 1) the request is not subject to the rules 254 and the browser extension 154 does not alter operation of the browser 152 and/or enables the browser 152 to open the webpage in a new navigation tab; or 2) the request is subject to the tab management rules 254 and the rules engine 252 of browser extension 154 commands the browser engine 212 of browser 152 to render the web resources in a current active webpage and navigation tab, while interrupting the generation of a new navigation tab. These responses can be further fine-tuned as richer rules and settings are integrated into the rules engine 252. In one embodiment, the tab management rules 254 may be accessed by an administrator to define the applicable rules. More specific details about operation of the browser extension 154 in this capacity will be provided below.

Figure 3:
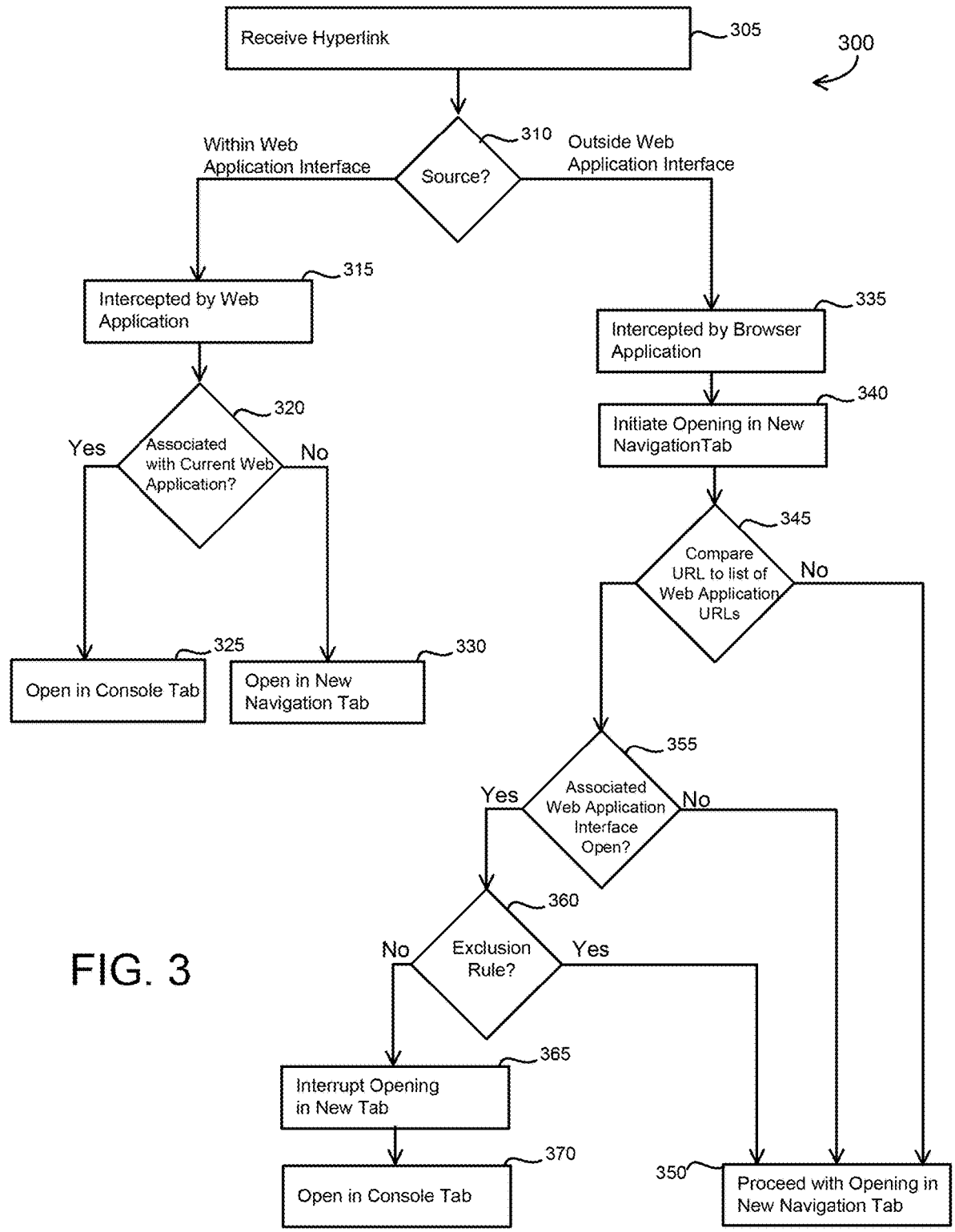
FIG. 3 is a flowchart of a method for providing web resources in accordance with an exemplary embodiment.
Figure 4:
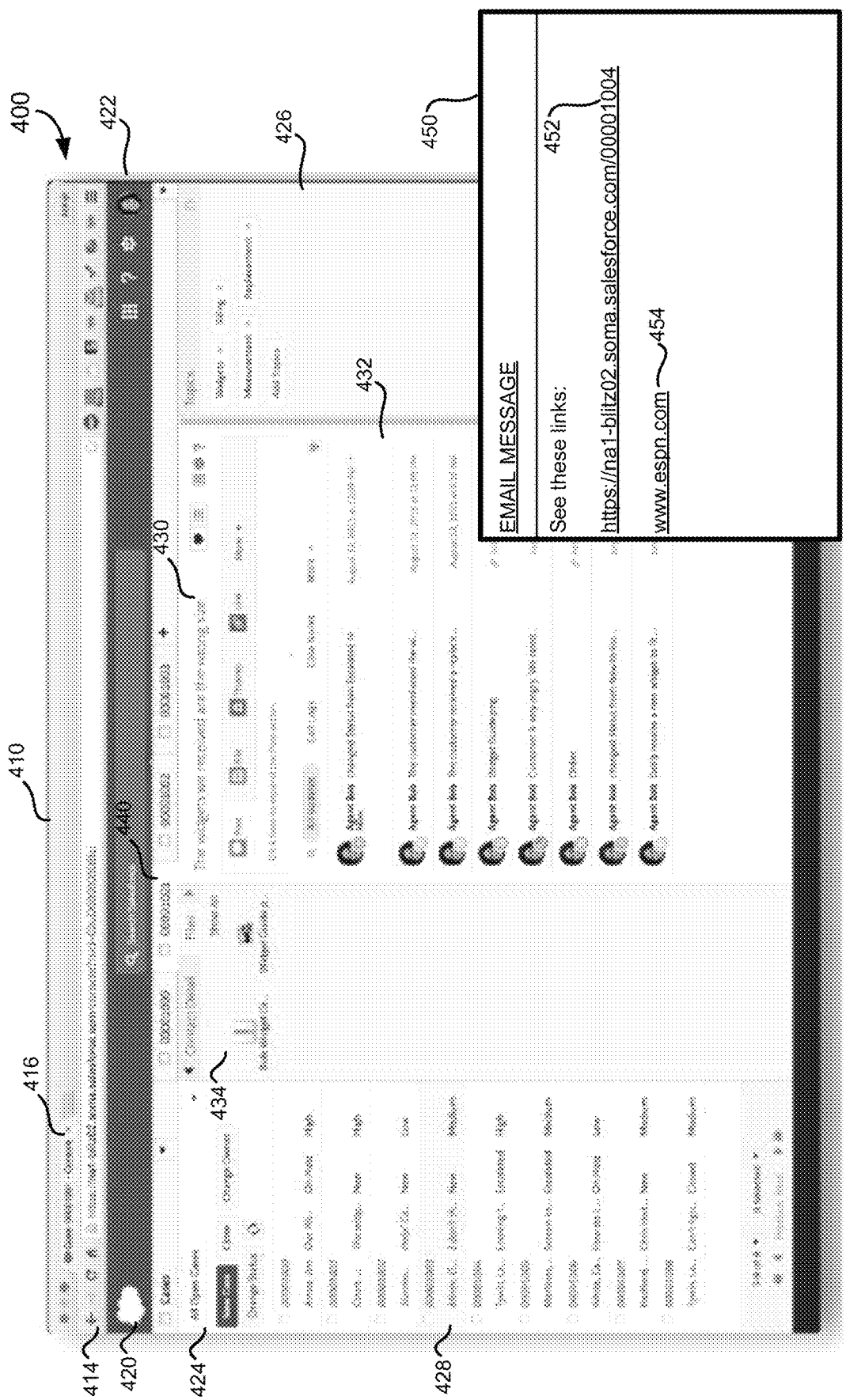
FIGS. 4-6 are example device graphical user interfaces of the user device associated with the browser application of FIG. 2 in accordance with exemplary embodiments.
Figure 5:
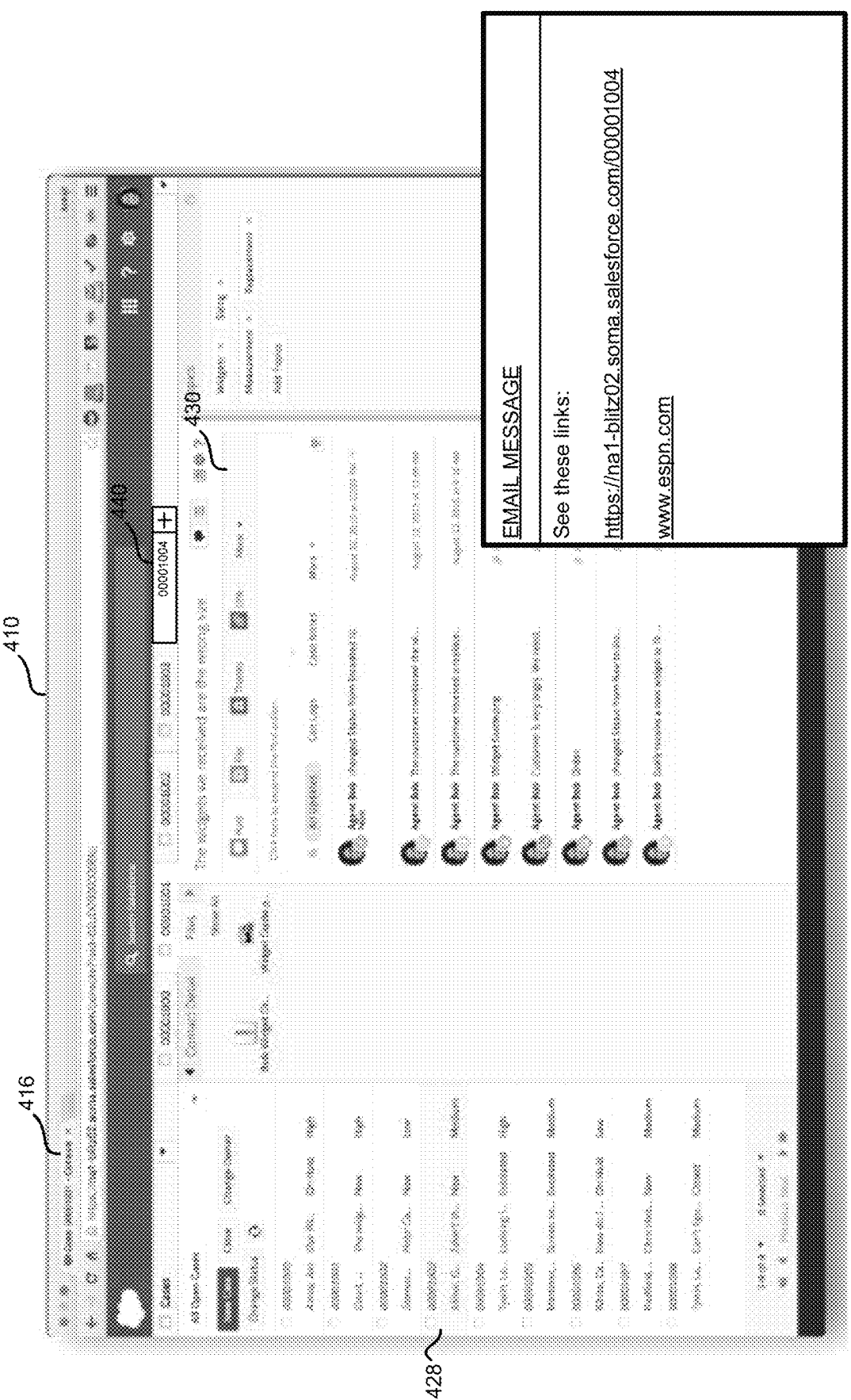
Figure 6:
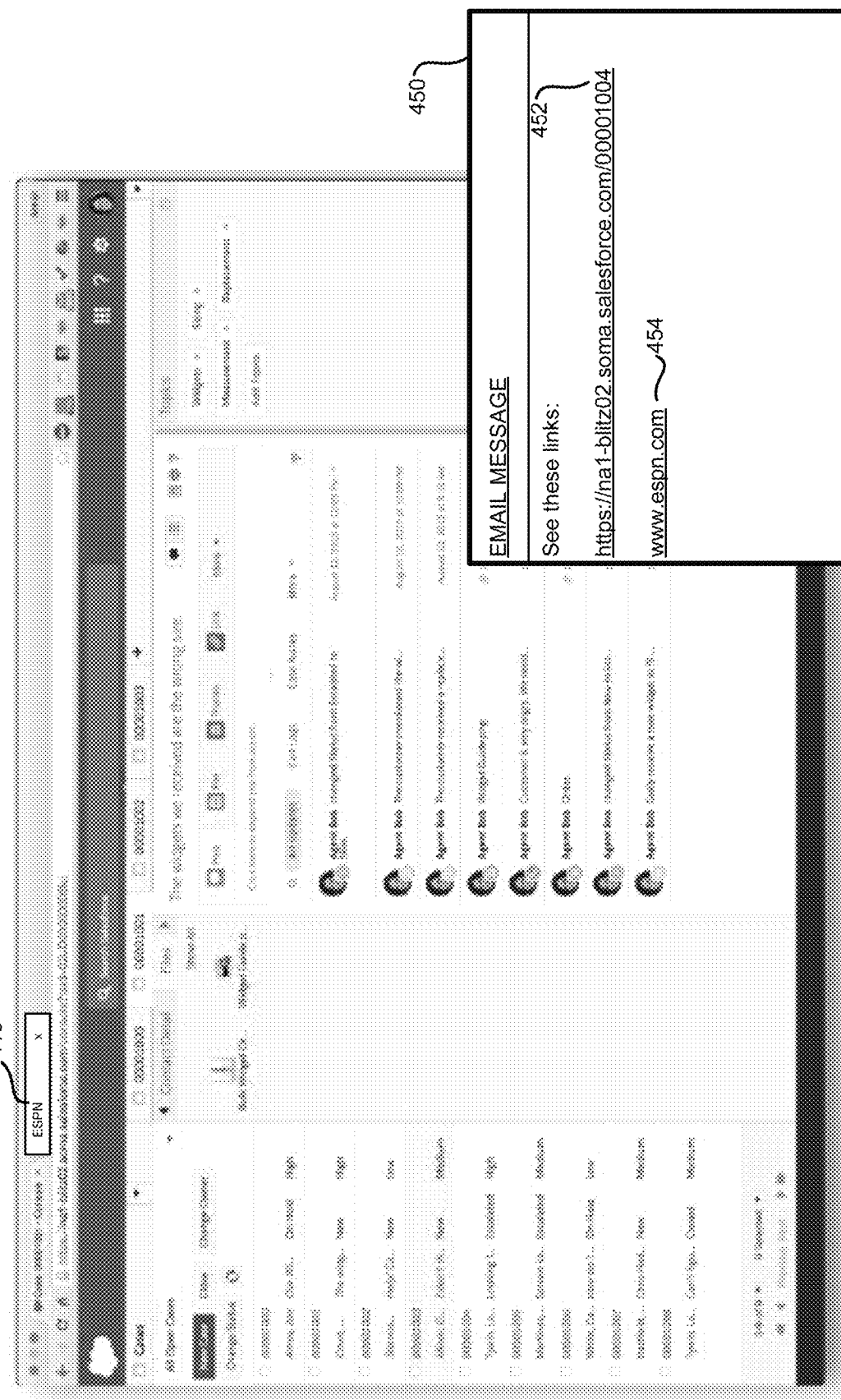

Additional descriptions of the operation of the browser application 150, particularly in the context of a web application interface 156, are provided with reference to FIGS. 3-6. FIG. 3 is a flowchart depicting a method 300 for accessing web resources and managing navigation tabs during operation of the browser application 150. FIG. 4 is a page view of the device interface 400 of user device 120 prior to selection of a hyperlink and initiation of the method 300 of FIG. 3, and FIGS. 5 and 6 are page views depicting particular scenarios of the method 300.

The various tasks performed in connection with the method 300 may be performed by software, hardware, firmware, or any combination thereof. For illustrative purposes, the following description of the method 300 may refer to elements mentioned above in connection with FIGS. 1 and 2, and as noted above, FIGS. 4-6 are referenced as examples. It should be appreciated that the method 300 may include any number of additional or alternative tasks, the tasks shown in FIG. 3 need not be performed in the illustrated order, and the method 300 may be incorporated into a more comprehensive procedure or process having additional functionality not described in detail herein. Moreover, one or more of the tasks shown in FIG. 3 could be omitted from an embodiment of the method 300 as long as the intended overall functionality remains intact.

Generally, the method 300 of FIG. 3 is performed in the environment 100 of FIG. 1 when the user is accessing web resources with the browser application 150, an example of which is accessing web application 115 of database system 110 on the user device 120.

As a brief example of such a scenario, FIG. 4 is a first view of a device graphical user interface ("device interface") 400 that may be displayed on the user device 120 within the environment 100 of FIG. 1. As shown, the device interface 400 may include a browser graphical user interface ("browser interface") 410. In one embodiment, the browser interface 410 is a graphical representation of the browser interface 210 of browser 152 and presented on the user device 120.

Generally, the browser interface 410 may include typical browser elements, including an address bar 412, navigation buttons 414, and navigation tabs (or main tabs) 416. As is common, a user may view one of a number of websites (or other type of network information) via the browser interface 410 by selecting the appropriate navigation tab 416.

In the depicted embodiment, the browser interface 410 is presenting a graphical representation of web application interface 156 for the web application 115 on the browser 152 as a platform or interface for accessing records and other web resources stored on database system 110. The web application interface 115 may include a number of console elements and areas, and the particular example in FIG. 4 should not be limiting. Generally, an administrator or user may configure the appearance and information of the web application interface 156 in any suitable manner. In the depicted embodiment, the web application interface 156 is presented in the context of a customer relationship management system. In this example, the web application interface 156 includes a header bar 422 configured to receive user input associated with search and administration functions. The web application interface 156 also includes first and second sidebar areas 424, 426. The sidebar areas 424, 426 may present various types of information. In this example, the first sidebar area 424 includes a list of open cases, and the second sidebar area 426 includes a list of relevant topics.

The web application interface 156 further includes a main area 430. In this example, the main area 430 presents information associated with one or more records. In one embodiment, the main area 430 presents a record page that represents a webpage containing details associated with the associated record. Although the appearance, type, and arrangement of record information may vary, in this example, the main area 430 includes a record page containing a feed 432 with posts, messages, file, and links associated with the respective record and a record detail 434 for accessing contract and file details associated with the respective record. Although record pages are discussed below, other types of pages presented within the web application interface 156 may include user profiles; chatter, information, or data feeds; record lists; custom objects; and/or custom applications.

Typically, one record page is viewable or "active" at a particular time. However, a user may require interaction with numerous records. As such, the web application interface 156 generally enables a user to have multiple record pages open at the same time, and the user may navigate between record pages and/or other types of web application or console resource pages by selecting an appropriate console tab 440. In the depicted example, the web application interface 156 has four record pages open, as indicated by the console tabs 440. Each console tab 440 is labeled according to the name of the record. For example, the record page associated with the current or active view is "Record 00001001" and the record pages open and available for viewing upon selection of one of the other console tabs 440 include "Record 00001000", "Record 00001002", and "Record 00001003". In other embodiments, the console tabs 440 may be used to present other types of console resources, such as user profiles; chatter, information, or data feeds; record lists; custom objects; and/or custom applications.

The user may open additional record pages within the web application interface 156 in a number of ways. For example, selection of a record from the case list in sidebar area 424 will result in that record page being opened and viewable in main area 430. In effect, the case list in sidebar area 424 functions as a collection of hyperlinks to request access to those records. For example, case (or hyperlink) 428 in sidebar area 424 is labeled for reference. Selecting case 428 results in the opening of the record page associated with the case in area 430.

The web application interface 156 may make the selected record page immediately active and viewable in the main area 430, or the web application interface 156 may open the record and add an additional console tab 440 for selection and viewing by the user. Other ways in which the user may open additional record pages include selecting links to those records in other records in the web application interface 156 and messages received in the web application interface 156. Generally, when the user initiates the opening of a record page via any form of hyperlink within the web application interface 156, the record page is opened within the main area 430 of the current instance of the web application interface 156, as discussed in greater detail below. In addition to records, hyperlinks may provide may reference other types of console resources that may be presented in console tabs 440.

The device interface 400 may further display additional graphical elements generated by other computing applications 160 of the user device 120. For example, in FIG. 4, a window associated with an email message 450 is displayed on the device interface 400. The content of the email message 450 includes two hyperlinks 452, 454. Additional details about operation of the browser application 150 upon selection of the hyperlinks 452, 454 and/or other hyperlinks are discussed below.

Now that the general environment of operation has been introduced, reference is again made to FIG. 3 that depicts a method 300 for managing navigation tabs during operation of the browser application 150. Although method 300 is discussed in the context of records, exemplary embodiments are more generally applicable to any type of web application resource or console resource.

In step 305, the browser application 150 receives a hyperlink selected by the user as a request to provide desired web resources.

In step 310, the browser application 152 opens the hyperlink in a manner determined by the source of the hyperlink. In step 310, if the hyperlink is opened within an instance of a web application interface 156 presented by the browser 152, the method 300 proceeds to step 315. Otherwise, if the hyperlink is from another source, outside of the web application interface 156, the method proceeds to step 335.

In step 315, the web application interface 156 intercepts the hyperlink, and in step 320, the hyperlink is evaluated based on the relationship between the web application 115 and the hyperlink. In step 320, the web application 115 effectively controls the manner in which hyperlinks from the web application interface 156 are opened. In one embodiment of step 320, the web application 115 determines if the hyperlink represents a data record (or other type of web application or console resource) accessible via the web application interface 156. If the hyperlink is a data record accessible via the web application interface 156, the method 300 proceeds to step 325. If the hyperlink is not a data record accessible via the web application interface 156, the method 300 proceeds to step 330.

In step 325, if the hyperlink is associated with records accessible with the particular instance of the web application interface 156 running on the browser 152, the web application 115 will open the appropriate record within the web application interface 156 under a console tab.

One example of this step 325 is illustrated by FIG. 5. In FIG. 5, record "00001004" has been opened in the main area 430, as indicated by associated console tab 440. In one example, the opening of record "00001004" may be the result of a user selection of hyperlink 428 within the active navigation tab 416 of the web application interface 156.

Returning to FIG. 3, in step 330, the web application interface 156 directs the hyperlink to the browser 152, which initiates the opening of the hyperlink in a new navigation tab.

In step 335, the browser application 150 intercepts or otherwise receives information associated with the hyperlink. In one embodiment, the browser extension 154 is configured to intercept the hyperlink.

In step 340, the browser application 152 initiates opening of a new navigation tab based on the hyperlink, as described above. In some embodiments, step 340 may be omitted.

In step 345, the browser application 152 evaluates the hyperlink to determine if the hyperlink is associated with a record of a web application (e.g., web application 115). The browser application 152 may evaluate the hyperlink to determine if the hyperlink is associated with a record in a number of ways. In one embodiment, the browser extension 154 evaluates the hyperlink. For example, the browser extension 154 may have a list of URLs or URL fragments stored in the tab management rules 254 that represent records of one or more web applications such that the rules engine 252 may perform content matching to recognize records. In a simple example, the browser extension 154 may monitor hyperlinks for indications of a domain or source ending with or including a predefined string (e.g., <*salesforce.com>). In further embodiments, the browser extension 154 may recognize identifying information in associated browser cookies, HTTP request or reply headers or content, and/or HTTP request states that specify handling of the hyperlink. Typically, the information identifying the hyperlink as a record also indicates the associated web application, e.g., by indicating the source or domain of the web application.

If, in step 345, the hyperlink is not associated with a record of a web application, the method 300 proceeds to step 350 in which the browser 152 proceeds with opening the hyperlink with a new navigation tab.

One example of steps 345 and 350 is illustrated by FIG. 6. In FIG. 6, hyperlink 454 from message 450 in FIG. 4 has been selected. Since the hyperlink 454 is not associated with a record of a web application, the browser 152 proceeds to open a new navigation tab 416 associated with the link. In the example of FIG. 6, the hyperlink 454 is associated with www.espn.com, not the web application 115 such that a new navigation tab for www.espn.com has been opened.

Returning to FIG. 3, if, in step 345, the hyperlink is recognized as a record of a web application, the method 300 proceeds to step 355 in which the browser application 150 determines if the associated web application is active within the browser 152.

In step 355, the browser application 150 determines if the record represented by the hyperlink is associated with one of the active navigation tabs. As such, the browser application 150 determines if the web application interface for the record of the hyperlink is already open in the browser 152. In one embodiment, the browser extension 154 makes this determination. For example, the rules engine 252 may compare web application associated with the hyperlink to a list of active navigation tabs maintained by the rules engine 252 and/or the browser engine 212. As an example, if the hyperlink is a record of web application 115, the rules engine 252 determines if the web application interface 154 is an active navigation tab. If the hyperlink is associated with one of the active navigation tabs, the method 300 proceeds to step 360. If the hyperlink is not associated with one of the active navigation tabs, the method 300 proceeds to step 350 in which the browser 152 proceeds with opening the hyperlink with a new navigation tab.

In step 360, the browser application 150 evaluates the hyperlink to determine if the hyperlink is appropriate to open in a console tab of the associated active navigation tab. This step may be performed in a number of ways and may be embodied as process exclusions in the tab management rules 254. Such process exclusions may be associated with instances or scenarios in which data records that would typically be opened in a console tab are instead opened in a new navigation tab. As examples, the data record of the hyperlink may be an administrative web resource or the like such that the corresponding record page is more appropriate for a new navigation tab, or the user may be testing sub-applications or processes on the data record rather than typical operation of the web application 115. In step 360, if the browser extension 154 determines that the hyperlink is not appropriate to open in a console tab of the associated web application interface, the method 300 proceeds to step 350 in which the browser extension 154 takes no action and/or commands the browser application 152 to proceed with rendering the web resources of the hyperlink with a new navigation tab. In step 360, if the browser extension 154 determines that the hyperlink is appropriate to open in a console tab of the associated active navigation tab, the method 300 proceeds to step 365.

In step 365, the browser application 150 interrupts and/or closes the opening of a new navigation tab based on the hyperlink, and step 370, the browser application 150 opens the hyperlink in a console tab of the associated active web application interface 156. In one embodiment, the rules engine 252 of the browser extension 154 generates a command to the browser engine 212 to initiate these steps.

One example of steps 345, 355, 360, 365, and 370 is illustrated by FIG. 5. In FIG. 5, record "00001004" has been opened in the main area 430 as a record page, as indicated by associated console tab 440. In one example, the opening of record "00001004" may be a result of a user selection of hyperlink 452 from the email message 450. As such, in FIG. 5, even though the hyperlink originated from a source other than the web application interface 156, the browser application 150 opened with associated record within the active navigation tab of the web application interface 156 as a console tab 440 rather than opening up a new navigation tab 416 of the browser 152.

Accordingly, exemplary embodiments improve the presentation of web resources from a database system to a user accessing the system from a browser on a user device. In particular, exemplary embodiments improve the management of navigation tabs and console tabs such that requested web resources, particularly records, are accessed in a more efficient manner. In effect, exemplary embodiments enable the recognition of an active web application as the "handler" of appropriate database web application links, even if such links are from outside of the web application interface.

Figure 7:
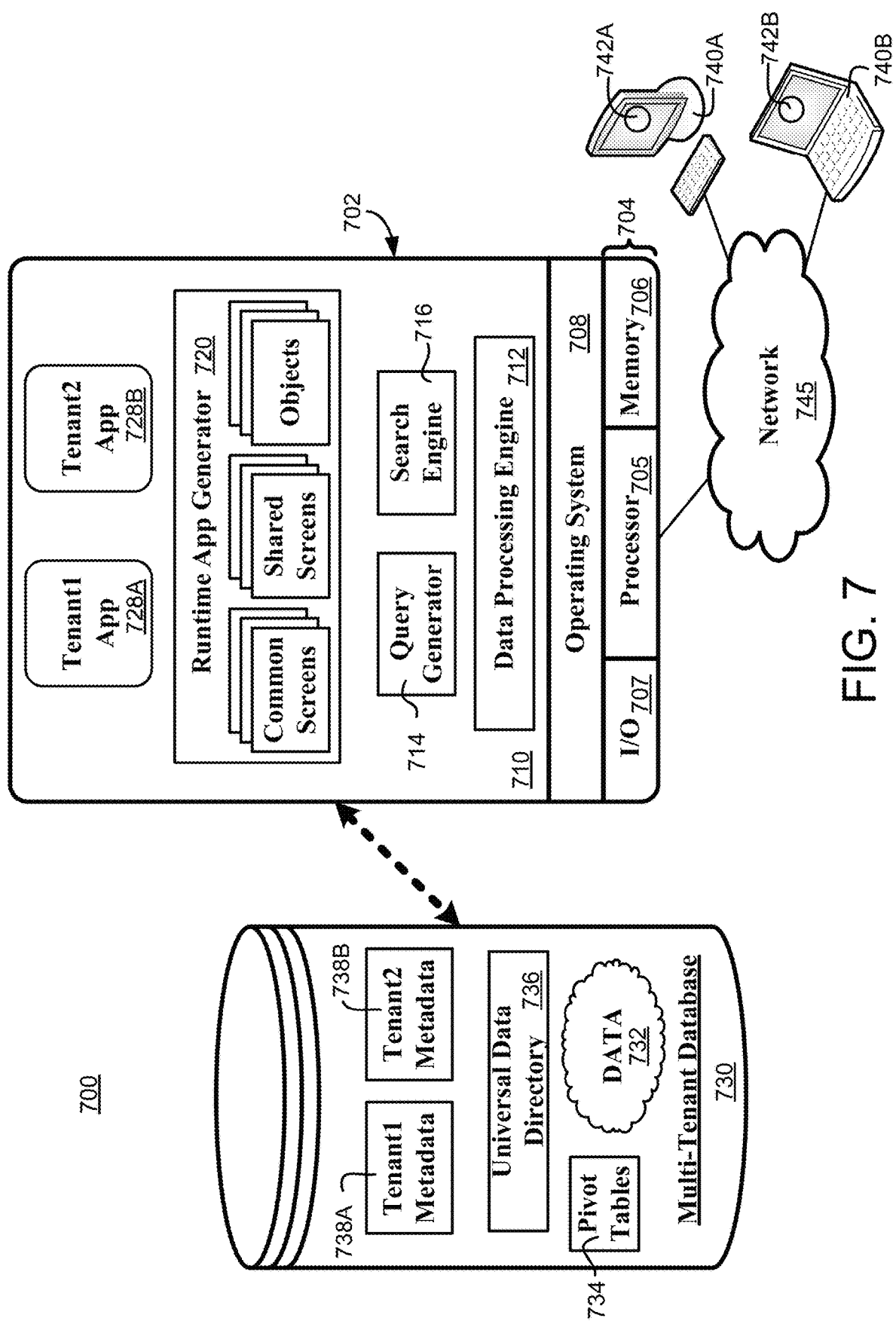
FIG. 7 is a block diagram of an exemplary multi-tenant application system that may provide web resources to the browser application of FIG. 2 in accordance with an exemplary embodiment.

In some exemplary embodiments, the systems and methods described above may be implemented in a multi-tenant application system, such as the multi-tenant application system 700 illustrated in FIG. 7. The multi-tenant application system 700 may be considered an example of the environment 100 of FIG. 1. Referring to FIG. 7, an exemplary multi-tenant application system 700 suitably includes a server 702 (e.g., database system 110) that dynamically creates virtual applications 728A-B based upon data 732 from a common database 730 that is shared between multiple tenants. Data and services generated by the virtual applications 728A-B are provided via network 745 (e.g., network 102 of FIG. 1) to any number of client devices 740A-B, as desired. Each virtual application 728A-B is suitably generated at run-time using a common platform 710 that securely provides access to data 732 in database 730 for each of the various tenants subscribing to system 700. As examples, the virtual applications 728A-B may correspond to one or more of the web applications 115 discussed above, and devices 740A-B may correspond to one or more of the devices 120 discussed above.

A "tenant" or "organization" generally refers to a group of users that shares access to common data within database 730. Tenants may represent customers, customer departments, business or legal organizations, and/or any other entities that maintain data for particular sets of users within system 700. Using the examples above, a tenant may correspond to a client. Although multiple tenants may share access to a common server 702 and database 730, the particular data and services provided from server 702 to each tenant can be securely isolated from those provided to other tenants, as described more fully below. The multi-tenant architecture therefore allows different sets of users to share functionality without necessarily sharing each other's data 732.

Database 730 is any sort of repository or other data storage system capable of storing and managing data 732 associated with any number of tenants. Database 730 may be implemented using any type of conventional database server hardware. In various embodiments, database 730 shares processing hardware 704 with server 702. In other embodiments, database 730 is implemented using separate physical and/or virtual database server hardware that communicates with server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

Data 732 may be organized and formatted in any manner to support multi-tenant application platform 710. In various embodiments, data 732 is suitably organized into a relatively small number of large data tables to maintain a semi-amorphous "heap"-type format. Data 732 can then be organized as needed for a particular virtual application 728A-B. In various embodiments, conventional data relationships are established using any number of pivot tables 734 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738A-B for each tenant, as desired. Rather than forcing data 732 into an inflexible global structure that is common to all tenants and applications, then, database 730 is organized to be relatively amorphous, with tables 734 and metadata 736-738 providing additional structure on an as-needed basis. To that end, application platform 710 suitably uses tables 734 and/or metadata 736, 738 to generate "virtual" components of applications 728A-B to logically obtain, process, and present the relatively amorphous data 732 from database 730.

Server 702 is implemented using one or more actual and/or virtual computing systems that collectively provide a dynamic application platform 710 for generating virtual applications 728A-B. Server 702 operates with any sort of conventional computing hardware 704, such as any processor 705, memory 706, input/output features 707 and the like. Processor 705 may be implemented using one or more of microprocessors, microcontrol modules, processing cores and/or other computing resources spread across any number of distributed or integrated systems, including any number of "cloud-based" or other virtual systems. Memory 706 represents any non-transitory short or long term storage capable of storing programming instructions for execution on processor 705, including any sort of random access memory (RAM), read only memory (ROM), flash memory, magnetic or optical mass storage, and/or the like. Input/output features 707 represent conventional interfaces to networks (e.g., to network 745, or any other local area, wide area or other network), mass storage, display devices, data entry devices and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like. In a typical embodiment, application platform 710 gains access to processing resources, communications interfaces and other features of hardware 704 using any sort of conventional or proprietary operating system 708. As noted above, server 702 may be implemented using a cluster of actual and/or virtual servers operating in conjunction with each other, typically in association with conventional network communications, cluster management, load balancing and other features as appropriate.

Application platform 710 is any sort of software application or other data processing engine that generates virtual applications 728A-B that provide data and/or services to client devices 740A-B. Virtual applications 728A-B are typically generated at run-time in response to queries received from client devices 740A-B. In the example illustrated in FIG. 7, application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

Runtime application generator 720 dynamically builds and executes virtual applications 728A-B in response to specific requests received from client devices 740A-B. Virtual applications 728A-B created by tenants are typically constructed in accordance with tenant-specific metadata 738, which describes the particular tables, reports, interfaces and/or other features of the particular application. In various embodiments, each virtual application 728A-B generates dynamic web content that can be served to a browser or other client program 742A-B associated with client device 740A-B, as appropriate. Data processing engine 712 performs bulk processing operations on data 732 such as uploads or downloads, updates, online transaction processing and/or the like.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant. Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

Data and services provided by server 702 can be retrieved using any sort of personal computer, mobile telephone, tablet or other network-enabled client device 740 on network 745. Typically, the user operates a conventional browser or other client program 742 to contact server 702 via network 745 using, for example, the hypertext transport protocol (HTTP) or the like. The user typically authenticates his or her identity to the server 702 to obtain a session identification ("SessionID") that identifies the user in subsequent communications with server 702. When the identified user requests access to a virtual application 728, application generator 720 suitably creates the application at run time based upon metadata 736 and 738, as appropriate. Query generator 714 suitably obtains the requested data 732 from database 730 as needed to populate the tables, reports or other features of virtual application 728. As noted above, the virtual application 728 may contain Java, ActiveX or other content that can be presented using conventional client software 742 running on client device 740; other embodiments may simply provide dynamic web or other content that can be presented and viewed by the user, as desired.

Generally speaking, the various functions and features described above may be carried out with any sort of hardware, software and/or firmware logic that is stored and/or executed on any platform. Some or all aspects of exemplary embodiments may be carried out, for example, by logic executing within platform 710 in FIG. 7, for example, using software or firmware logic that is stored in memory and executed by processor as part of application platform. The particular hardware, software and/or firmware logic may vary from context to context, implementation to implementation, and embodiment to embodiment in accordance with the various features, structures and environments set forth herein. The particular means used to implement each of the various functions may be any sort of processing structures that are capable of executing software and/or firmware logic in any format, and/or any sort of application-specific or general purpose hardware, including any sort of discrete and/or integrated circuitry.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configurable to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1-7 depicts exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer implemented method of accessing a web application from a database system by a user in a browser application executed on a user device, the method executable at the user device, the method comprising:

receiving, at the browser application, a first request for web resources based on user selection of a first hyperlink outside of the web application;

determining if the first hyperlink is associated with a record accessible by the web application from the database system, wherein the determining is performed by a browser extension of the browser application and includes:

receiving, by a rules engine of the browser extension, the first hyperlink and determining if the first hyperlink is subject to rules associated with the rules engine;

commanding, by the rules engine of the browser extension upon determining the first hyperlink is subject to the rules associated with the rules engine and when the web application interface for the web application is active in the at least one navigation tab, the presenting of the record within the console tab of the web application interface in the at least one navigation tab; and interrupting, by the rules engine of the browser extension upon determining the first hyperlink is subject to the rules associated with the rules engine and when the web application interface for the web application is active in the at least one navigation tab, a generation of a new navigation tab;

determining, when the first hyperlink is associated with the record for the web application, if a web application interface for the web application is active in at least one navigation tab of the browser application;

presenting, when the first hyperlink is associated with the record for the web application and the web application interface for the web application is active in the at least one navigation tab, the record within a new console tab of the web application interface in the at least one navigation tab; and presenting, when the first hyperlink is associated with the record for the web application and the web application interface for the web application is not active in the at least one navigation tab, the web application interface in a new navigation tab and presenting the record within the web application interface.

2. The computer implemented method of claim 1, further comprising presenting, when the first hyperlink is not associated with the record for the web application, the web resources based on the first hyperlink within a new navigation tab of the browser application.

3. The computer implemented method of claim 1, wherein the receiving the first request includes receiving the first request based on the user selection of the first hyperlink from a source outside of the browser application.

4. The computer implemented method of claim 1, wherein the receiving the first request includes receiving the first request based on the user selection of the first hyperlink from a source inside of the browser application.

5. The computer implemented method of claim 1, wherein the presenting the record includes presenting each request for records in an individual console tab of the web application interface in the at least one navigation tab.

6. The computer implemented method of claim 1, wherein the determining if the first hyperlink is associated with the record accessible by the web application from the database system is determined by comparing the first hyperlink to a list of URLs or URL fragments associated with the web application.

7. The computer implemented method of claim 1, wherein the determining if the web application interface is active includes comparing the first hyperlink to a list of active navigation tabs.

8. A system for accessing a web application from a database system configurable to present multiple console tabs within a navigation tab of a browser application on a user device, the system comprising:

a processor; and memory storing one or more computer programs executable by the processor to perform operations of the browser application on the user device, the operations including:

receiving a first request to access web resources based on user selection of a first hyperlink outside of the web application;

determining if the first hyperlink is associated with a record accessible by the web application from the database system, wherein the determining is performed by a browser extension of the browser application and includes:

receiving, by a rules engine of the browser extension, the first hyperlink and determining if the first hyperlink is subject to rules associated with the rules engine;

commanding, by the rules engine of the browser extension upon determining the first hyperlink is subject to the rules associated with the rules engine and when the web application interface for the web application is active in the at least one navigation tab, the presenting of the record within the console tab of the web application interface in the at least one navigation tab; and interrupting, by the rules engine of the browser extension upon determining the first hyperlink is subject to the rules associated with the rules engine and when the web application interface for the web application is active in the at least one navigation tab, a generation of a new navigation tab;

determining, when the first hyperlink is associated with the record for the web application, if a web application interface for the web application is active within the browser application;

presenting, when the first hyperlink is associated with the record for the web application and the web application interface for the web application is active in the at least one navigation tab, the record within a new console tab of the web application interface in the at least one navigation tab; and presenting, when the first hyperlink is associated with the record for the web application and the web application interface for the web application is not active in the at least one navigation tab, the web application interface in a new navigation tab and presenting the record within the web application interface.

9. The system of claim 8, the operations further including presenting, when the first hyperlink is not associated with the record for the web application, the web resources based on the first hyperlink within a new navigation tab of the browser application.

10. The system of claim 8, wherein the receiving the first request includes receiving the first request based on the user selection of the first hyperlink from a source outside of the browser application.

11. The system of claim 8, wherein the receiving the first request includes receiving the first request based on the user selection of the first hyperlink from a source inside of the browser application.

12. The system of claim 8, wherein the presenting the record includes presenting each request for records in an individual console tab of the web application interface in the at least one navigation tab.

13. The system of claim 8, wherein the determining if the first hyperlink is associated with the record accessible by the web application from the database system is determined by comparing the first hyperlink to a list of URLs or URL fragments associated with the web application.

14. A computer implemented method of displaying web resources to a user in a browser application executed on a user device, the method executable at the user device, the method comprising:
   providing a web application interface in a first navigation tab of the browser application on the user device, the web application interface configurable to access a web application on a database system;
   receiving, at the browser application, a first web resources request based on a first hyperlink selected from outside of the web application interface;
   evaluating the first hyperlink to determine if the first hyperlink is associated with a record for the web application, wherein the evaluating is performed by a browser extension of the browser application and includes:
      receiving, by a rules engine of the browser extension, the first hyperlink and determining if the first hyperlink is subject to rules associated with the rules engine;
      commanding, by the rules engine of the browser extension upon determining the first hyperlink is subject to the rules associated with the rules engine and when the web application interface for the web application is active in the at least one navigation tab, the presenting of the record within the console tab of the web application interface in the at least one navigation tab; and
      interrupting, by the rules engine of the browser extension upon determining the first hyperlink is subject to the rules associated with the rules engine and when the web application interface for the web application is active in the at least one navigation tab, a generation of a new navigation tab;
   presenting, when the first hyperlink is associated with the record for the web application, the record in a new console tab of the web application interface in the first navigation tab in the browser application on the user device; and
   presenting, when the first hyperlink is not associated with the record for the web application, web resources based on the first hyperlink in a second navigation tab of the browser application in the browser application on the user device.

15. The computer implemented method of claim 14, further comprising presenting, when the first hyperlink is not associated with the record for the web application, the web resources based on the first hyperlink within a new navigation tab of the browser application.

16. The computer implemented method of claim 14, wherein the receiving the first request includes receiving the first request based on the user selection of the first hyperlink from a source outside of the browser application.

17. The computer implemented method of claim 14, wherein the receiving the first request includes receiving the first request based on the user selection of the first hyperlink from a source inside of the browser application.

18. The computer implemented method of claim 14, wherein the presenting the record includes presenting each request for records in an individual console tab of the web application interface in the at least one navigation tab.

19. The computer implemented method of claim 14, wherein the determining if the first hyperlink is associated with the record accessible by the web application from the database system is determined by comparing the first hyperlink to a list of URLs or URL fragments associated with the web application.

20. The computer implemented method of claim 14, wherein the determining if the web application interface is active includes comparing the first hyperlink to a list of active navigation tabs.

* * * * *